(12) United States Patent
Tschetter

(10) Patent No.: US 9,648,796 B1
(45) Date of Patent: May 16, 2017

(54) SKID STEER ATTACHMENT

(71) Applicant: Bemis J. Tschetter, Huron, SD (US)

(72) Inventor: Bemis J. Tschetter, Huron, SD (US)

( * ) Notice: Subject to any disclaimer, the term of this patent is extended or adjusted under 35 U.S.C. 154(b) by 349 days.

(21) Appl. No.: 13/963,615

(22) Filed: Aug. 9, 2013

(51) Int. Cl.
*A01B 43/00* (2006.01)
*A01B 35/14* (2006.01)

(52) U.S. Cl.
CPC .............. *A01B 35/14* (2013.01); *A01B 43/00* (2013.01)

(58) Field of Classification Search
CPC .......... E02F 5/32; E02F 3/8152; A01B 43/00; A01B 35/14
USPC ...................................... 37/302, 303; 171/46
See application file for complete search history.

(56) References Cited

U.S. PATENT DOCUMENTS

| | | | | |
|---|---|---|---|---|
| 2,281,928 A | * | 5/1942 | Fletcher ........................ | 172/777 |
| 2,284,388 A | * | 5/1942 | Gurries ......................... | 172/466 |
| 2,626,468 A | * | 1/1953 | Dobrinich, Jr. ................ | 37/302 |
| 2,693,650 A | * | 11/1954 | Struemph ...................... | 37/302 |
| 2,735,197 A | * | 2/1956 | Struemph ...................... | 37/301 |
| 2,840,932 A | * | 7/1958 | Breyer ........................... | 172/777 |
| 3,103,076 A | * | 9/1963 | Schultz .......................... | 37/303 |
| 3,325,927 A | * | 6/1967 | Mullin ........................... | 299/36.1 |
| 3,418,734 A | * | 12/1968 | McConnell ..................... | 37/407 |
| 3,603,007 A | * | 9/1971 | Naber et al. ................... | 37/303 |
| 3,876,090 A | * | 4/1975 | Holland ......................... | 414/685 |
| 4,090,616 A | * | 5/1978 | Runyan et al. ................ | 414/24.5 |
| 4,256,426 A | * | 3/1981 | Buss ............................. | 414/24.5 |
| 4,547,984 A | * | 10/1985 | Adams ........................... | 37/301 |
| 4,641,439 A | * | 2/1987 | Shirek ........................... | 37/303 |
| 4,749,048 A | * | 6/1988 | Kelly ............................. | 172/699 |
| 5,098,252 A | * | 3/1992 | Sheesley ............... | E02F 3/3627 172/273 |
| 5,666,794 A | * | 9/1997 | Vought ................... | A01D 41/16 172/112 |
| 5,901,479 A | * | 5/1999 | Langdon ........................ | 37/444 |
| 6,098,320 A | | 8/2000 | Wass | |
| 6,308,440 B1 | * | 10/2001 | Mueller ......................... | 37/404 |
| 6,315,056 B1 | * | 11/2001 | Ransom et al. ........... | 172/684.5 |
| 6,405,460 B1 | * | 6/2002 | Whitmire et al. ............. | 37/405 |
| 6,517,164 B1 | | 2/2003 | White | |
| 6,578,297 B1 | * | 6/2003 | Forsberg ........................ | 37/444 |
| 6,588,127 B1 | * | 7/2003 | Brittian, III .................. | 37/403 |
| 6,601,891 B1 | | 8/2003 | Gregory, Jr. | |
| 6,722,843 B2 | | 4/2004 | Mensch | |
| 6,764,139 B1 | | 7/2004 | Wortman | |
| 7,014,412 B2 | | 3/2006 | Daniel | |
| 7,055,698 B1 | | 6/2006 | Keigley | |
| 7,086,184 B2 | | 8/2006 | Archuleta, Jr. et al. | |
| 7,104,745 B2 | * | 9/2006 | Ochoa .......................... | 414/722 |
| 7,322,133 B2 | | 1/2008 | Horton | |

(Continued)

*Primary Examiner* — Thomas B Will
*Assistant Examiner* — Joan D Misa

(57) ABSTRACT

A skid steer prying attachment device facilitates removal of large rocks or the like embedded in the ground. The device includes a frame having a top side, a bottom side, and a pair of lateral sides coupled to and extending between the top side and the bottom side. The frame is substantially planar having a forward face and a rearward face. A connector is coupled to the frame wherein the frame is configured for being coupled to a skid steer such that the forward face faces outwardly from the skid steer. A tongue is coupled to and extends from the frame outwardly from the forward face of the frame. A wedge is coupled to and extends from a distal end of the tongue relative to the frame.

15 Claims, 5 Drawing Sheets

(56) References Cited

U.S. PATENT DOCUMENTS

| | | | |
|---|---|---|---|
| 7,407,016 B1* | 8/2008 | Kvalo | 172/784 |
| 7,520,306 B1* | 4/2009 | Berge | 144/334 |
| 7,610,698 B2* | 11/2009 | May | 37/302 |
| 7,695,214 B2* | 4/2010 | Mailand | 404/90 |
| 8,069,591 B2 | 12/2011 | Dunn | |
| 8,109,709 B1 | 2/2012 | Gaetze | |
| 8,745,903 B1* | 6/2014 | Ritter | 37/303 |
| 2004/0060208 A1* | 4/2004 | Wagner | 37/452 |
| 2005/0252048 A1* | 11/2005 | Segerljung | 37/403 |
| 2006/0248754 A1* | 11/2006 | Martin | 37/302 |
| 2008/0000208 A1* | 1/2008 | Edwards | A01G 3/002 56/7 |
| 2008/0016725 A1* | 1/2008 | Boehm | 37/302 |
| 2012/0207576 A1* | 8/2012 | Kraft et al. | 414/785 |
| 2012/0291319 A1 | 11/2012 | Jones | |
| 2013/0248556 A1* | 9/2013 | May | 222/1 |
| 2015/0042116 A1* | 2/2015 | Jacobson | 294/197 |

* cited by examiner

SKID STEER ATTACHMENT

BACKGROUND OF THE DISCLOSURE

Field of the Disclosure

The disclosure relates to skid steer prying attachment device devices and more particularly pertains to a new skid steer prying attachment device for facilitating removal of large rocks or the like embedded in the ground.

SUMMARY OF THE DISCLOSURE

An embodiment of the disclosure meets the needs presented above by generally comprising a frame having a top side, a bottom side, and a pair of lateral sides coupled to and extending between the top side and the bottom side. The frame is substantially planar having a forward face and a rearward face. A connector is coupled to the frame wherein the frame is configured for being coupled to a skid steer such that the forward face faces outwardly from the skid steer. A tongue is coupled to and extends from the frame outwardly from the forward face of the frame. A wedge is coupled to and extends from a distal end of the tongue relative to the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
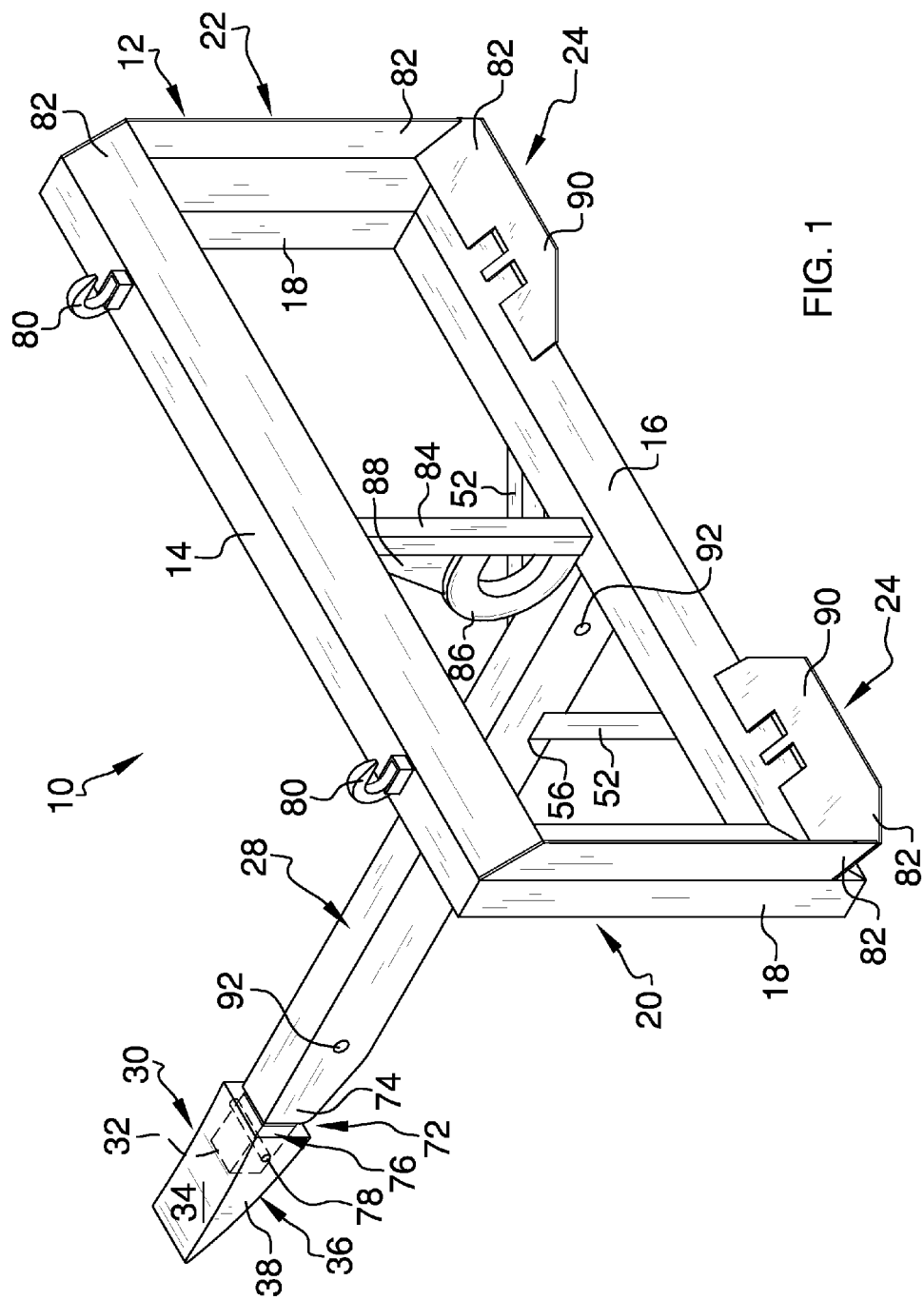
FIG. 1 is a top back side perspective view of a skid steer prying attachment device according to an embodiment of the disclosure.
Figure 2:
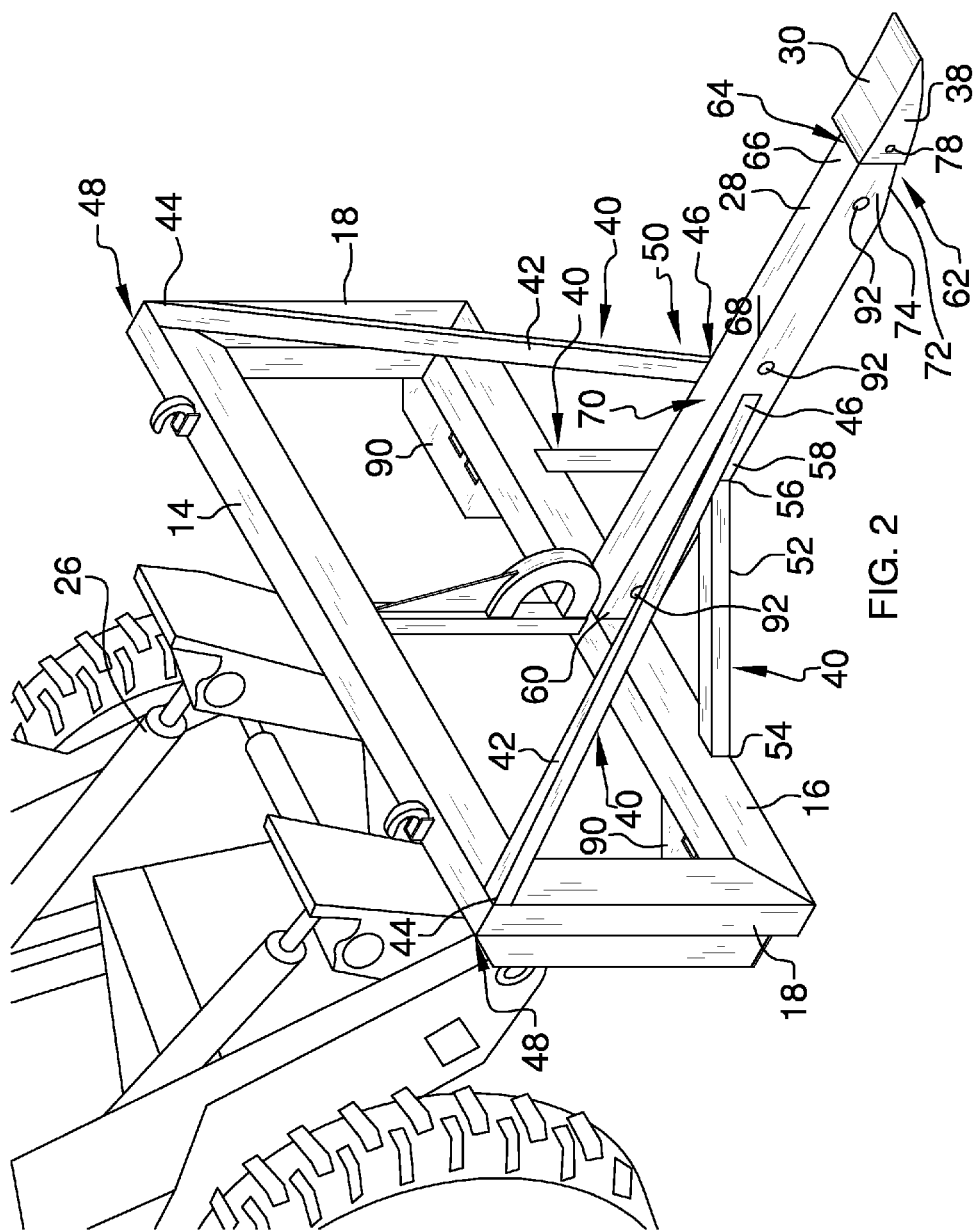
FIG. 2 is a top front side perspective view of an embodiment of the disclosure.
Figure 3:
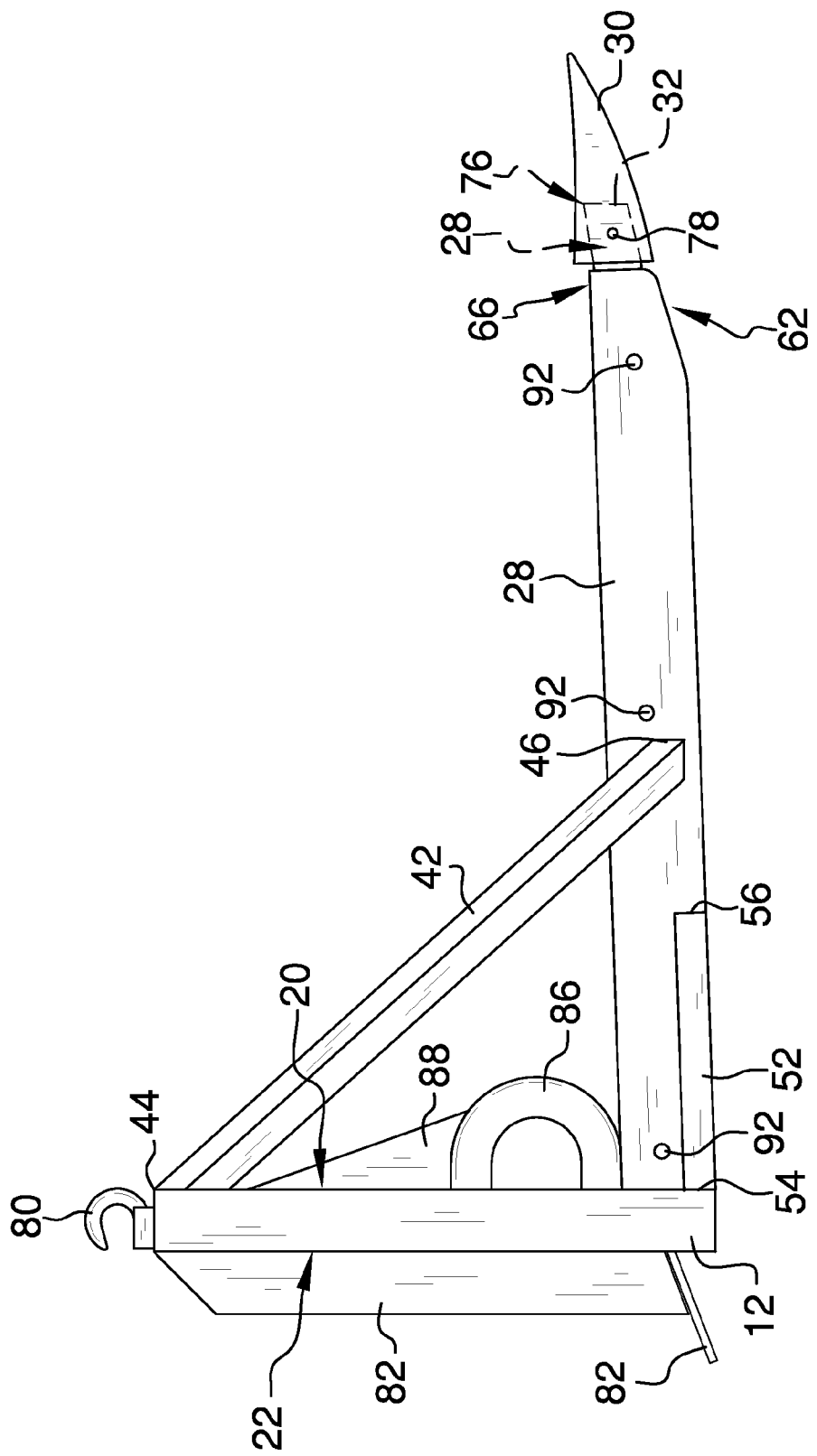
FIG. 3 is a side view of an embodiment of the disclosure.
Figure 4:
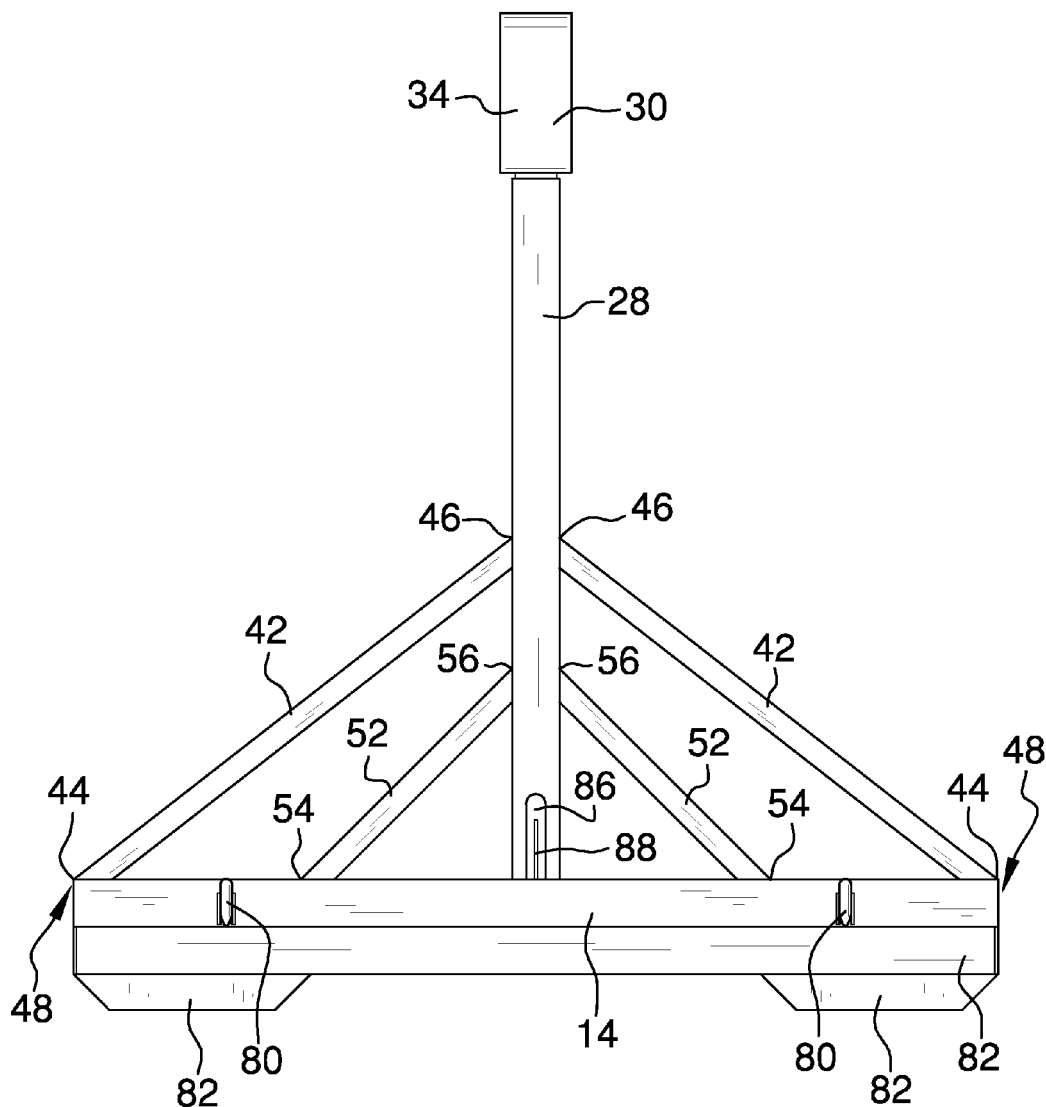
FIG. 4 is a top view of an embodiment of the disclosure.
Figure 5:
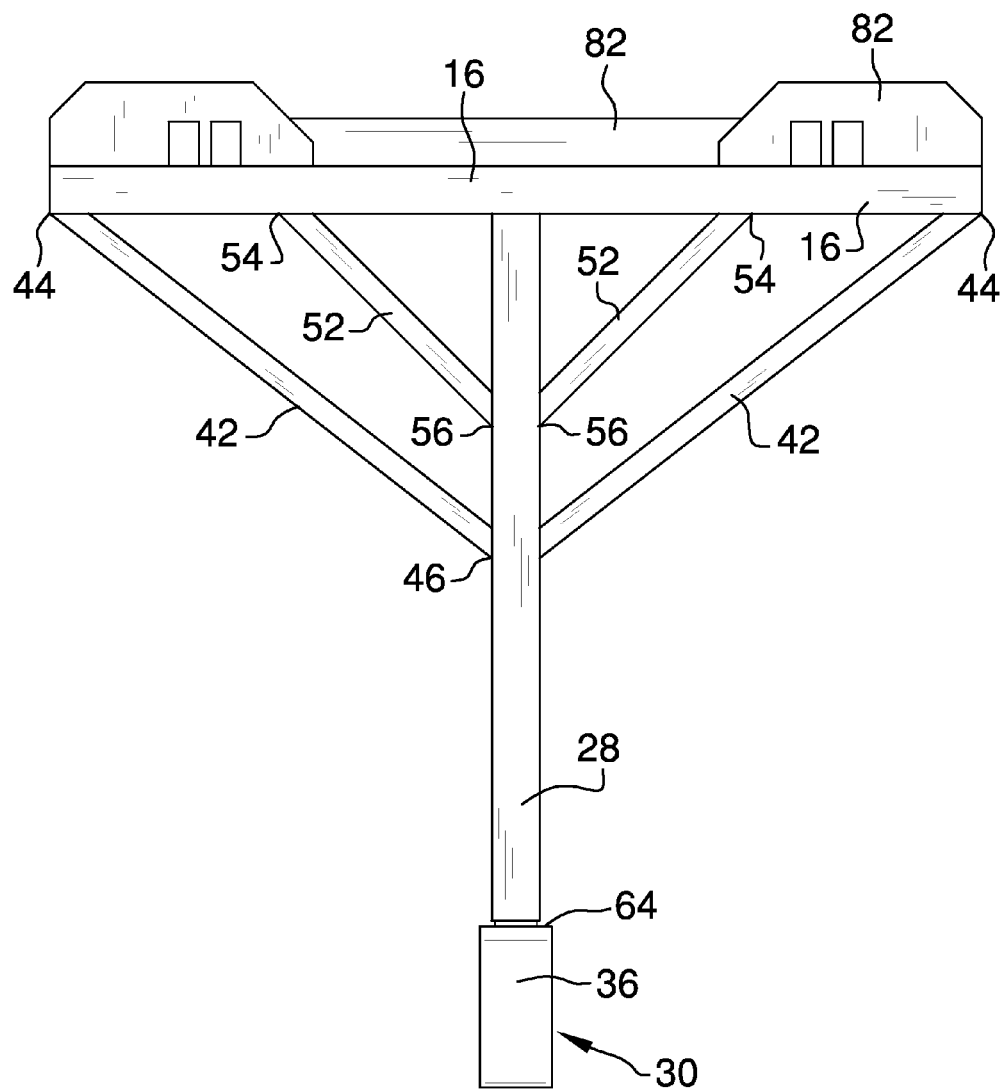
FIG. 5 is a bottom view of an embodiment of the disclosure.

With reference now to the drawings, and in particular to FIGS. 1 through 5 thereof, a new skid steer prying attachment device embodying the principles and concepts of an embodiment of the disclosure and generally designated by the reference numeral 10 will be described.

As best illustrated in FIGS. 1 through 5, the skid steer prying attachment device 10 generally comprises a frame 12 which may be substantially rectangular having a top side 14, a bottom side 16, and a pair of lateral sides 18 coupled to and extending between the top side 14 and the bottom side 16. The frame 12 may be substantially planar having a forward face 20 and a rearward face 22. A connector 24 is coupled to the frame 12 wherein the frame 12 is configured for being coupled to a skid steer 26 such that the forward face 20 faces outwardly from the skid steer 26. An elongated tongue 28 is coupled to and extends from the frame 12. The tongue 28 extends outwardly from the forward face 20 of the frame 12 away from the skid steer 26. The tongue 28 may be angled relative to the forward face 20 of the frame 12 such that the tongue 28 extends outwardly away from the forward face 20 of the frame 12 and upwardly from the bottom side 16 of the frame 12 towards the top side 14 of the frame 12. The angle may be such that the top side 14 of the frame 12 is laterally offset between 8 and 20 centimeters from vertical when the tongue 28 is in a horizontal position. Lateral holes 92 may be extended through the tongue 28 and spaced along a length of the tongue 28.

A wedge 30 is coupled to the tongue 28 and may be removably coupled to the tongue 28 for replacement or repair as needed. The wedge 30 extends from a distal end 32 of the tongue 28 relative to the frame 12. The wedge 30 may have a planar top surface 34 and a curved bottom surface 36 such that the wedge 30 tapers extending away from the frame 12. The wedge 30 may have parallel side surfaces 38 extending between the top surface 34 and the bottom surface 36.

A plurality of braces 40 may be provided. Each brace 40 is coupled to and extends between the frame 12 and the tongue 28 to stabilize and strengthen the tongue 28. The plurality of braces 40 may include a pair of upper braces 42. Each upper brace 42 has a first end 44 coupled to the frame 12 and a second end 46 coupled to the tongue 28. The first end 44 of each upper brace 42 is coupled to a junction 48 of the top side 14 and an associated one of aid lateral sides 18 of the frame 12. The second end 46 of each upper brace 42 may be coupled to a medial section 50 of the tongue 28. The plurality of braces 40 may further comprise a pair of lower braces 52. Each lower brace 52 has a first end 54 coupled to the frame 12 and a second end 56 coupled to the tongue 28. The first end 54 of each lower brace 52 is coupled to the bottom side 16 of the frame 12. The second end 56 of each lower brace 52 may be coupled to an associated side surface 58 of the tongue 28. Each second end 46 of the lower brace 42 may be positioned on the tongue 28 between a proximal end 60 of the tongue 28 relative to the frame 12 and an associated one of the second ends 56 of the upper braces 52.

A distal portion 62 of the tongue 28 relative to the frame 12 may taper extending away from the frame 12. The distal portion 62 of the tongue 28 is positioned adjacent to the wedge 30. The size and shape of the tongue 28 may be generally thicker than a back face 64 of the wedge 30 such that the distal portion 62 of the tongue 28 tapers to align with the bottom surface 36 of the wedge 30. An upper surface 66 of the distal portion 62 of the tongue 28 may be coplanar with an upper surface 68 of a medial portion 70 of the tongue 28 extending from the distal portion 62 of the tongue 28. More particularly, a bottom surface 72 of the distal portion 62 of the tongue 28 tapers towards the upper surface 66 of the distal portion 62 of the tongue 28. The distal portion 62 of the tongue 28 may have parallel planar side surfaces 74.

A cavity 76 may extend into the back face 64 of the wedge 30. The distal end 32 of the tongue 28 is inserted into the cavity 76 extending into the wedge 30. A pin 78 is extendable through the wedge 30 and the tongue 28 in conventional fashion wherein the pin 78 couples the wedge 30 to the tongue 28.

The connector 24 may comprise a pair of spaced hooks 80 coupled to and extending upwardly from the top side 14 of the frame 12 and a plurality of support plates 82. Each support plate 82 is coupled to and extends rearwardly from the rearward face 22 of the frame 12 in a conventional configuration for typical attachment to an existing skid steer 26. The support plates 82 may include a pair of bottom plates 90 angled downwardly extending away from the rearward face 22 of the frame 12.

A central brace 84 may be coupled to and extend between the top side 14 of the frame 12 and the bottom side 16 of the frame 12 aligned with or coplanar with the tongue 28. A loop 86 may be coupled to and extend forwardly from the central brace 84 for securing a chain or the like to the device 10. A gusset 88 may also be coupled to and extend between the loop 86 and the central brace 84 to further strengthen the structure.

In use, the frame 12 is attached to the skid steer 26. The controls of the skid steer 26 may then be used to manipulate the positioning of the tongue 28 and wedge 30 allowing the power of the skid steer 26 to be used to pry large rocks, tree roots, or the like from being embedded in soil. The single tongue 28 being, elongated and extending from the frame 12 facilitates insertion of the wedge and tongue into the ground adjacent to an object such as a large rock with minimal damage to the surrounding ground and less resistance to prying of the object as the single tongue 28 is more easily positioned to engage the object itself and not surrounding ground or soil.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A skid steer prying attachment device comprising:
   a frame having a top side, a bottom side, and a pair of lateral sides coupled to and extending between said top side and said bottom side, said frame being substantially planar having a forward face and a rearward face;
   a connector coupled to said frame wherein said frame is configured for being coupled to a skid steer such that said forward face faces outwardly from the skid steer;
   a single straight elongated tongue being coupled to and extending from said frame, said tongue extending outwardly and towards said top side of said frame from said forward face of said frame such that said tongue is upwardly angled extending away from said front face of said frame, said tongue having a free distal end relative to said frame; and
   a wedge coupled to and extending forwardly from said distal end of said tongue relative to said frame such that said wedge extends from said distal end of said tongue in linear alignment with said tongue and is forwardly positioned in spaced relationship to said frame, said wedge being removably coupled to said distal end of said tongue, said wedge having a planar top surface, said wedge having a curved bottom surface such that said wedge tapers extending away from said frame.

2. The device of claim 1, further comprising a plurality of braces coupled to and extending between said frame and said tongue.

3. The device of claim 2, further comprising said plurality of braces comprising a pair of upper braces, each said upper brace having a first end coupled to said frame and a second end coupled to said tongue, said first end of each said upper brace being coupled to a junction of said top side and an associated one of said lateral sides of said frame, said second end of each said upper brace being coupled to a medial section of said tongue.

4. The device of claim 3, further comprising said plurality of braces comprising a pair of lower braces, each said lower brace having a first end coupled to said frame and a second end coupled to said tongue, said first end of each said lower brace being coupled to said bottom side of said frame, said second end of each said lower brace being coupled to an associated side surface of said tongue.

5. The device of claim 4, further comprising each said second end of said lower brace being positioned on said tongue between a proximal end of said tongue relative to said frame and an associated one of said second ends of said upper braces.

6. The device of claim 1, further comprising a distal portion of said tongue relative to said frame tapering extending away from said frame, said distal portion of said tongue being positioned adjacent to said wedge.

7. The device of claim 6, further comprising an upper surface of said distal portion of said tongue being coplanar with an upper surface of a medial portion of said tongue extending from said distal portion of said tongue, a bottom surface of said distal portion of said tongue tapering towards said upper surface of said distal portion of said tongue, said distal portion of said tongue having parallel planar side surfaces.

8. The device of claim 1, further comprising said wedge having parallel side surfaces.

9. The device of claim 1, further comprising:
   a cavity extending into said wedge, said distal end of said tongue being inserted into said cavity extending into said wedge; and
   a pin extending through said wedge and said tongue, said pin coupling said wedge to said tongue.

10. The device of claim 1, said connector further comprising:
    a pair of spaced hooks coupled to and extending upwardly from said top side of said frame; and
    a plurality of support plates, each support plate being coupled to and extending rearwardly from said rearward face of said frame.

11. The device of claim 1, further comprising said tongue being angled relative to said forward face of said frame wherein said tongue extends outwardly away from said forward face of said frame and upwardly from said bottom side of said frame towards said top side of said frame.

12. The device of claim 1, further comprising a central brace coupled to and extending between said top side of said frame and said bottom side of said frame.

13. The device of claim 12, further comprising a loop coupled to and extending forwardly from said central brace.

14. The device of claim 13, further comprising a gusset coupled to and extending between said loop and said central brace.

15. A skid steer prying attachment device comprising:
- a frame having a top side, a bottom side, and a pair of lateral sides coupled to and extending between said top side and said bottom side, said frame being substantially planar having a forward face and a rearward face;
- a connector coupled to said frame wherein said frame is configured for being coupled to a skid steer such that said forward face faces outwardly from the skid steer;
- a single straight elongated tongue being coupled to and extending from said frame, said tongue extending outwardly and towards said top side of said frame from said forward face of said frame such that said tongue is upwardly angled extending away from said front face of said frame, said tongue being angled relative to said forward face of said frame wherein said tongue extends outwardly away from said forward face of said frame and upwardly from said bottom side of said frame towards said top side of said frame, said tongue having a free distal end relative to said frame;
- a wedge removably coupled to and extending forwardly from said distal end of said tongue relative to said frame such that said wedge extends from said distal end of said tongue in linear alignment with said tongue and is forwardly positioned in spaced relationship to said frame, said wedge having a planar top surface, said wedge having a curved bottom surface such that said wedge tapers extending away from said frame, said wedge having parallel side surfaces;
- a plurality of braces coupled to and extending between said frame and said tongue, said plurality of braces comprising a pair of upper braces, each said upper brace having a first end coupled to said frame and a second end coupled to said tongue, said first end of each said upper brace being coupled to a junction of said top side and an associated one of said lateral sides of said frame, said second end of each said upper brace being coupled to a medial section of said tongue, said plurality of braces comprising a pair of lower braces, each said lower brace having a first end coupled to said frame and a second end coupled to said tongue, said first end of each said lower brace being coupled to said bottom side of said frame, said second end of each said lower brace being coupled to an associated side surface of said tongue, each said second end of said lower brace being positioned on said tongue between a proximal end of said tongue relative to said frame and an associated one of said second ends of said upper braces;
- a distal portion of said tongue relative to said frame tapering extending away from said frame, said distal portion of said tongue being positioned adjacent to said wedge;
- an upper surface of said distal portion of said tongue being coplanar with an upper surface of a medial portion of said tongue extending from said distal portion of said tongue, a bottom surface of said distal portion of said tongue tapering towards said upper surface of said distal portion of said tongue, said distal portion of said tongue having parallel planar side surfaces;
- a cavity extending into said wedge, said distal end of said tongue being inserted into said cavity extending into said wedge;
- a pin extending through said wedge and said tongue, said pin coupling said wedge to said tongue;
- a pair of spaced hooks coupled to and extending upwardly from said top side of said frame;
- a plurality of support plates, each support plate being coupled to and extending rearwardly from said rearward face of said frame;
- a central brace coupled to and extending between said top side of said frame and said bottom side of said frame;
- a loop coupled to and extending forwardly from said central brace; and
- a gusset coupled to and extending between said loop and said central brace.

* * * * *